US012722568B2

(12) United States Patent
Miller

(10) Patent No.: US 12,722,568 B2
(45) **Date of Patent: *Sep. 1, 2026**

(54) TRAILER TRACKING AND DETECTION SYSTEM

(71) Applicant: Landstar System Holdings, Inc., South Jacksonville, FL (US)

(72) Inventor: Matthew Miller, Jacksonville, FL (US)

(73) Assignee: Landstar System Holdings, Inc., South Jacksonville, FL (US)

(*) Notice: Subject to any disclaimer, the term of this patent is extended or adjusted under 35 U.S.C. 154(b) by 394 days.

This patent is subject to a terminal disclaimer.

(21) Appl. No.: 18/356,789

(22) Filed: Jul. 21, 2023

(65) Prior Publication Data

US 2024/0034238 A1 Feb. 1, 2024

Related U.S. Application Data

(60) Provisional application No. 63/432,263, filed on Dec. 13, 2022, provisional application No. 63/392,415, filed on Jul. 26, 2022.

(51) Int. Cl.
*B60R 1/00* (2022.01)

(52) U.S. Cl.
CPC ........ *B60R 1/003* (2013.01); *B60R 2300/301* (2013.01)

(58) Field of Classification Search
CPC .......................... B60R 1/003; B60R 2300/301
See application file for complete search history.

(56) References Cited

U.S. PATENT DOCUMENTS

| | | | | |
|---|---|---|---|---|
| 9,349,270 | B1 * | 5/2016 | Crossno | G08C 17/02 |
| 10,402,772 | B2 * | 9/2019 | Terwilliger | G06Q 10/0832 |
| 2014/0202800 | A1 * | 7/2014 | Breed | B60T 7/16 340/568.1 |
| 2016/0119539 | A1 * | 4/2016 | Tan | B60R 1/23 348/148 |
| 2017/0245104 | A1 * | 8/2017 | Klimek | G01S 5/0226 |
| 2018/0097884 | A1 * | 4/2018 | Terwilliger | H04L 67/52 |
| 2019/0302764 | A1 * | 10/2019 | Smith | B60W 60/0025 |
| 2023/0249680 | A1 * | 8/2023 | Zwegers | G06T 7/70 701/25 |

* cited by examiner

*Primary Examiner* — Timothy A Brainard
*Assistant Examiner* — Isabella A Edrada
(74) *Attorney, Agent, or Firm* — Honigman LLP

(57) ABSTRACT

A method of detecting and tracking a trailer. The computer-implemented method, when executed by data processing hardware causes the data processing hardware to perform operations. The operations include initiating, using a detection application, a beacon scan and detecting a signal attribute and a serial number for a plurality of beacons. The operations also include recording the signal attribute and the serial number for each of the plurality of beacons and determining, based on a proximity of a respective beacon to a user device within a predetermined time interval, that the respective beacon is communicatively connected to the detection application. The operations further include sending, in response to determining that the respective beacon is communicatively connected, a connection signal from the detection application to one of data storage of the detection application and the respective beacon.

23 Claims, 10 Drawing Sheets

TRAILER TRACKING AND DETECTION SYSTEM

PRIORITY CLAIM

This application claims priority from U.S. Provisional Patent Application No. 63/392,415, filed Jul. 26, 2022, and U.S. Provisional Patent Application No. 63/432,263, filed Dec. 13, 2022, both of which are incorporated by reference in their entirety.

TECHNICAL FIELD

This disclosure relates to a trailer tracking and detection system.

SUMMARY

One aspect of the disclosure provides a method of detecting and tracking a trailer. The computer-implemented method, when executed by data processing hardware causes the data processing hardware to perform operations. The operations can include initiating, using a detection application, a beacon scan and detecting a signal attribute and a serial number for a plurality of beacons. The operations also can include recording the signal attribute and the serial number for each of the plurality of beacons and determining, based on a proximity of a respective beacon to a user device within a predetermined time interval, that the respective beacon is communicatively connected to the detection application. The operations further can include sending, in response to determining that the respective beacon is communicatively connected, a connection signal from the detection application to one of data storage of the detection application and the respective beacon.

Implementations of the disclosure may include one or more of the following optional features. In some implementations, the operations may include determining, based on a lack of proximity of a respective beacon, that the plurality of beacons are free from communication with the detection application. In response to determining that the plurality of beacons are free from communication, a disconnect signal may be sent for the respective beacon. In another implementation, sending the connection signal may further include sending a list of all of the plurality of beacons detected to a data storage. In another aspect, the operations may include flagging, in response to a respective beacon of the recorded plurality of beacons not being detected, the respective beacon as out of range. Optionally, the operations may include determining, based on the proximity of the respective beacon to the user device within the predetermined time interval further includes executing the beacon scan continuously during the predetermined time interval. In a further implementation, the operations may include determining, based on the proximity of the respective beacon to the user device within the predetermined time interval further includes executing the beacon scan intermittently at predefined intervals over the predetermined time interval.

In a further implementation, the operations may include identifying a landmark and comparing a location of the detected plurality of beacons with the landmark. In response to the location of the detected plurality of beacons overlapping with the landmark, the operations may include generating a match signal. Using the match signal, the operations may include confirming that the respective beacon is communicatively connected. In a still further implementation, the operations may include determining that the respective beacon is communicatively connected to the detection application further comprises comparing a number of evaluations of the respective beacon to a connection threshold of the predetermined time interval. The connection threshold may include a minimum number of detections for the respective beacon.

Another aspect of the disclosure provides a system for detecting and tracking a trailer. The system can include data processing hardware and memory hardware in communication with the data processing hardware. The memory hardware stores instructions that when executed on the data processing hardware cause the data processing hardware to perform operations. The operations can include initiating, using a detection application, a beacon scan and detecting a signal attribute and a serial number for a plurality of beacons. The operations also can include recording the signal attribute and the serial number for each of the plurality of beacons and determining, based on a proximity of a respective beacon to a user device within a predetermined time interval, that the respective beacon is communicatively connected to the detection application. The operations further can include sending, in response to determining that the respective beacon is communicatively connected, a connection signal from the detection application to one of data storage of the detection application and the respective beacon.

This aspect may include one or more of the following optional features. In some implementations, the operations may include determining, based on a lack of proximity of a respective beacon, that the plurality of beacons are free from communication with the detection application. In response to determining that the plurality of beacons are free from communication, a disconnect signal may be sent for the respective beacon. In another implementation, sending the connection signal may further include sending a list of all of the plurality of beacons detected to a data storage of the system. In another aspect, the operations may include flagging, in response to a respective beacon of the recorded plurality of beacons not being detected, the respective beacon as out of range. Optionally, the operations may include determining, based on the proximity of the respective beacon to the user device within the predetermined time interval further includes executing the beacon scan continuously during the predetermined time interval. In a further implementation, the operations may include determining, based on the proximity of the respective beacon to the user device within the predetermined time interval further includes executing the beacon scan intermittently at predefined intervals over the predetermined time interval.

In a further implementation, the operations may include identifying a landmark and comparing a location of the detected plurality of beacons with the landmark. In response to the location of the detected plurality of beacons overlapping with the landmark, the operations may include generating a match signal. Using the match signal, the operations may include confirming that the respective beacon is communicatively connected. In a still further implementation, the operations may include determining that the respective beacon is communicatively connected to the detection application further comprises comparing a number of evaluations of the respective beacon to a connection threshold of the predetermined time interval. The connection threshold may include a minimum number of detections for the respective beacon.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
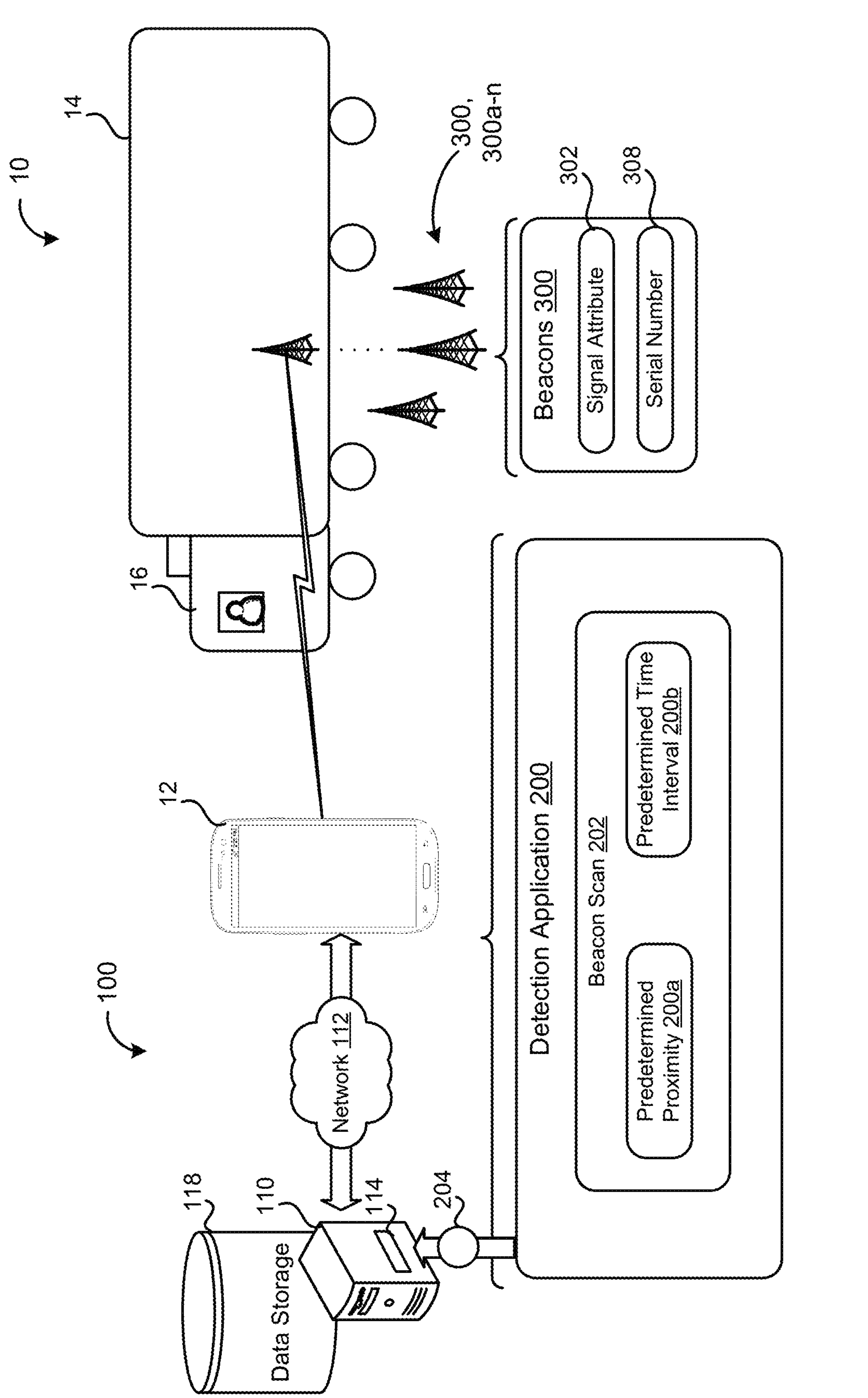
FIG. 1 is a schematic view of an example system for trailer detection.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIG. 1, in some implementations, an example trailer detection and tracking system 100 includes a remote system 110 in communication with one or more user devices 12 via a network 112. The remote system 110 may be a single computer, multiple computers, or a cloud environment and includes data processing hardware 114 and/or storage resources 118 (e.g., data storage). The system 100 includes a detection application 200 that may be installed on the user device 12 and/or incorporated as part of the remote system 110.

The system 100 is configured to track and/or monitor a truck system 10. For example, a trailer 14 of the truck system 10 may be equipped with a beacon 300. The trailer 14 may be configured as any one of a van, a pup, a rollerbed, a supervan, a tanker, a conestoga, a flatbed, a stepdeck, a refrigerated trailer, a chassis, a container, heavy specialized trailer equipment, a jeep, a stinger, a flip axle, a step or drop deck trailer, a lowboy trailer, a reefer trailer, a dump trailer, a dry van trailer, and/or a tipper trailer. As described below, the beacon 300 is detected by the detection application 200 and utilized to track the respective trailer 14. It is contemplated that the trailer 14 may refer to both the chassis and any container coupled to or disposed on the chassis, such that the beacon 300 may be utilized to detect and track the entirety of the trailer 14 including the chassis and/or any coupled container.

The beacon 300 is coupled or otherwise attached to the trailer 14. For example, the beacon 300 may be coupled exterior to the trailer 14 and/or interior to the trailer 14. The beacon 300 may be positioned in any location along the trailer 14 including, but not limited to, a front portion, a rear portion, a top portion, a bottom portion, and/or any side portion of the trailer 14. In one configuration a plurality of beacons 300, **300*a-n* may be utilized, such that a first beacon 300*a* may be positioned outside of the trailer 14 and second and third beacons 300*b*, 300*c* may be positioned inside of the trailer 14. Additionally or alternatively, the first and second beacons 300*a*, 300*b* may be positioned outside of the trailer 14 and the third beacon 300*c* may be positioned inside of the trailer 14. It is contemplated that any combination of the beacons 300, 300*a-n* may be utilized in any practicable location along the trailer 14 and that less than three beacons 300 or more than three beacons 300 may be utilized. The beacons 300, 300*a-n* may be configured with an internal power source that utilizes minimal servicing, such that placement of the beacons 300, 300***a-n* may generally remain constant for an extended period of time. By way of example, not limitation, the internal power source may be a battery with a operable life of approximately ten years. The internal power source of the beacons 300, 300*a-n* advantageously minimizes hardwiring of the beacons 300, 300*a-n* to an external power source, which minimizes the overall servicing of the beacons 300, 300*a-n* throughout the useful life of the beacons 300, 300*a-n*.

The beacon 300 is equipped with a serial number, which serves as an identification (ID) that may be utilized to identify and/or confirm the trailer 14 connected with a tractor 16 of the truck system 10, as described in more detail below. It is further contemplated that a driver of the tractor 16 may manually hook and unhook the trailer 14. The detection application 200 may detect the connected trailer 14 via the respective beacon 300 and may confirm that the correct trailer 14 is hooked with the tractor 16 to identify a confirmed tractor-trailer pair 20. Alternatively, the detection application 200 may detect a beacon 300 that is not a correct match. The detection application 200 may repeatedly scan to confirm that the detected beacon 300 is hooked and will report the status to the system 100. Where there is an incorrect pairing of the tractor-trailer pair 20, the driver may be notified via the user device 12 receiving a notification from the system 100.

The user device 12 may include, but is not limited to, a mobile device, an onboard computer, a chip integrated into an onboard computer, and/or an application integrated as part of an in-cabin monitoring system. For example, the user device 12 may be an electronic logging device, which is configured to maintain driver hours of service records and a record of duty status. The user device 12 may include the detection application 200, such that the user device 12 may, in addition to recording driving activity and updating driver logs, maintain a record of the detected beacons 300, 300*a-n*. It is contemplated that data collected by the detection application 200 may be stored in the data storage 118 of the remote system 110, as described in more detail below. For example, the data storage 118 may include a fleet management software that stores the compiled information from the user device 12, including the detected beacons 300, 300*a-n*. It is contemplated that in addition to the beacons 300, 300*a-n*, the user device 12 may capture information related to the vehicle identification, motor carrier identification, date, time, geographic location, miles traveled, engine power up and shutdown, yards moved, 60 minute intervals of motion, engine diagnostics and malfunction, driver or authorized user identification, driver log-on/log-off, hours of service, duty status changes (e.g., on duty and off duty), personal use, and/or certification of driver's daily record.

Figure 2:
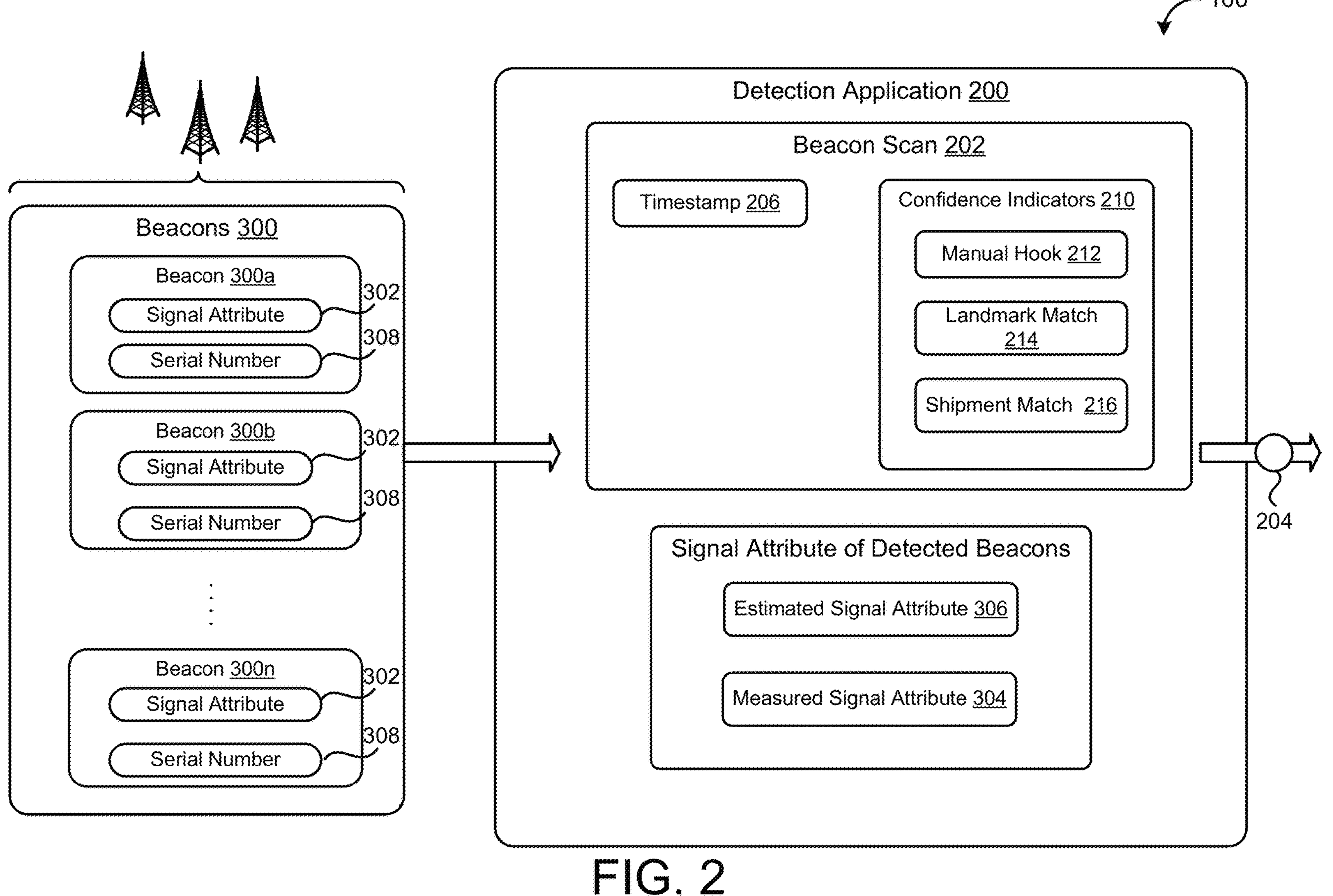
FIG. 2 is a schematic view of a detection application of the system of FIG. 1 in communication with a plurality of beacons.
Figure 3:
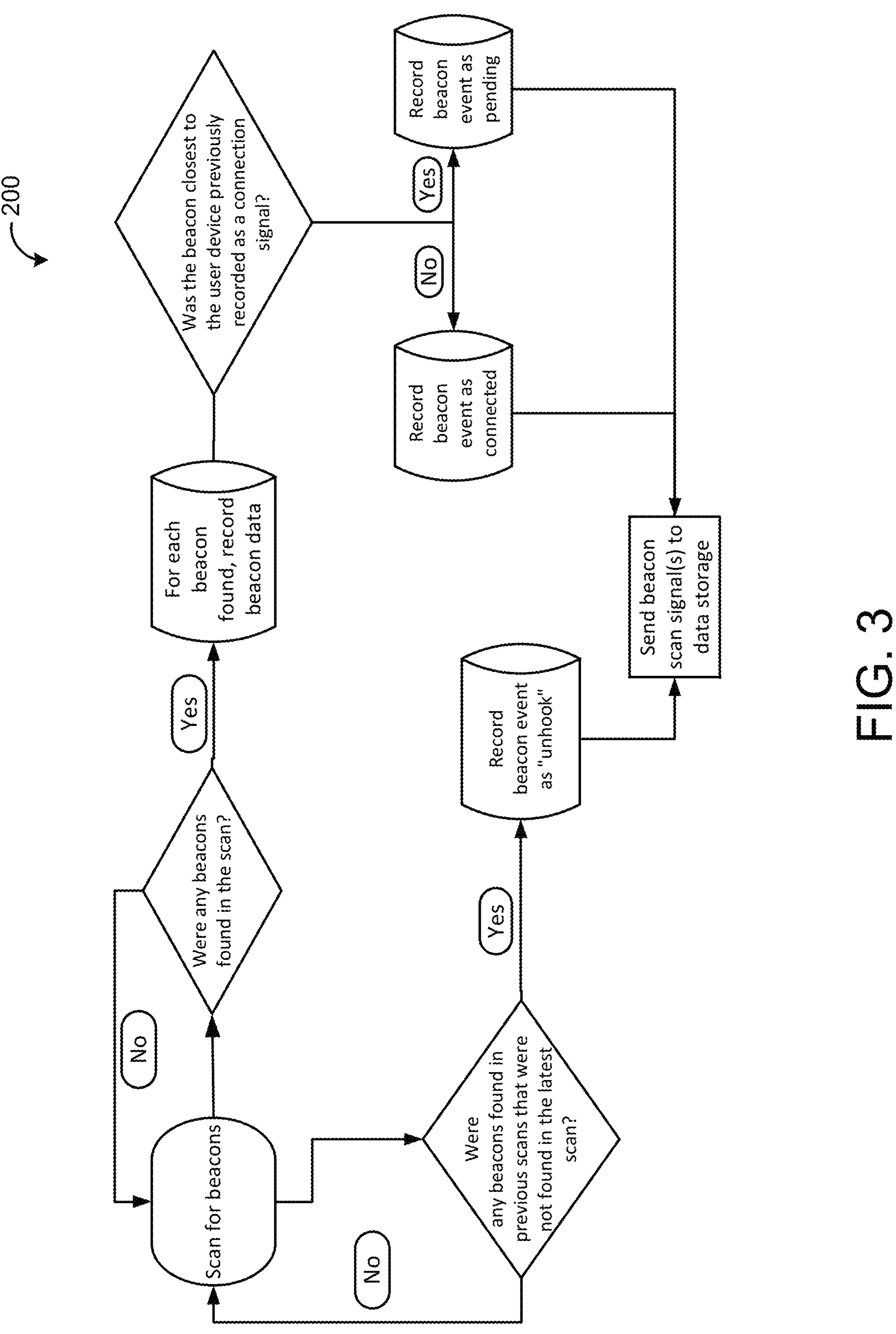
FIG. 3 a flow diagram of decision steps executed by a detection application of a system for trailer detection.
Figure 4:
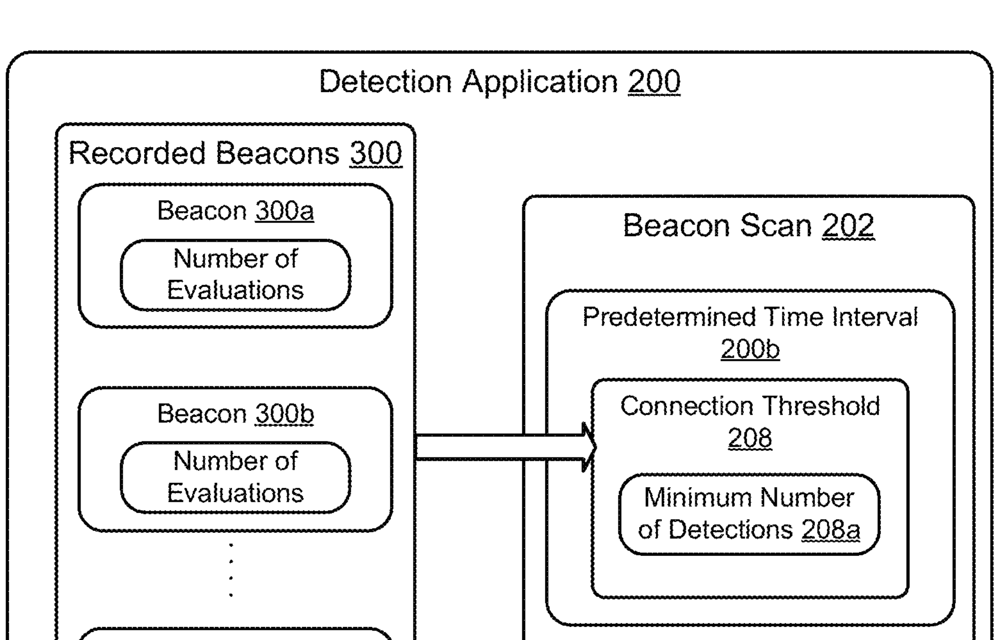
FIG. 4 is a schematic view of a detection application with recorded beacons and a connection threshold.
Figure 5:
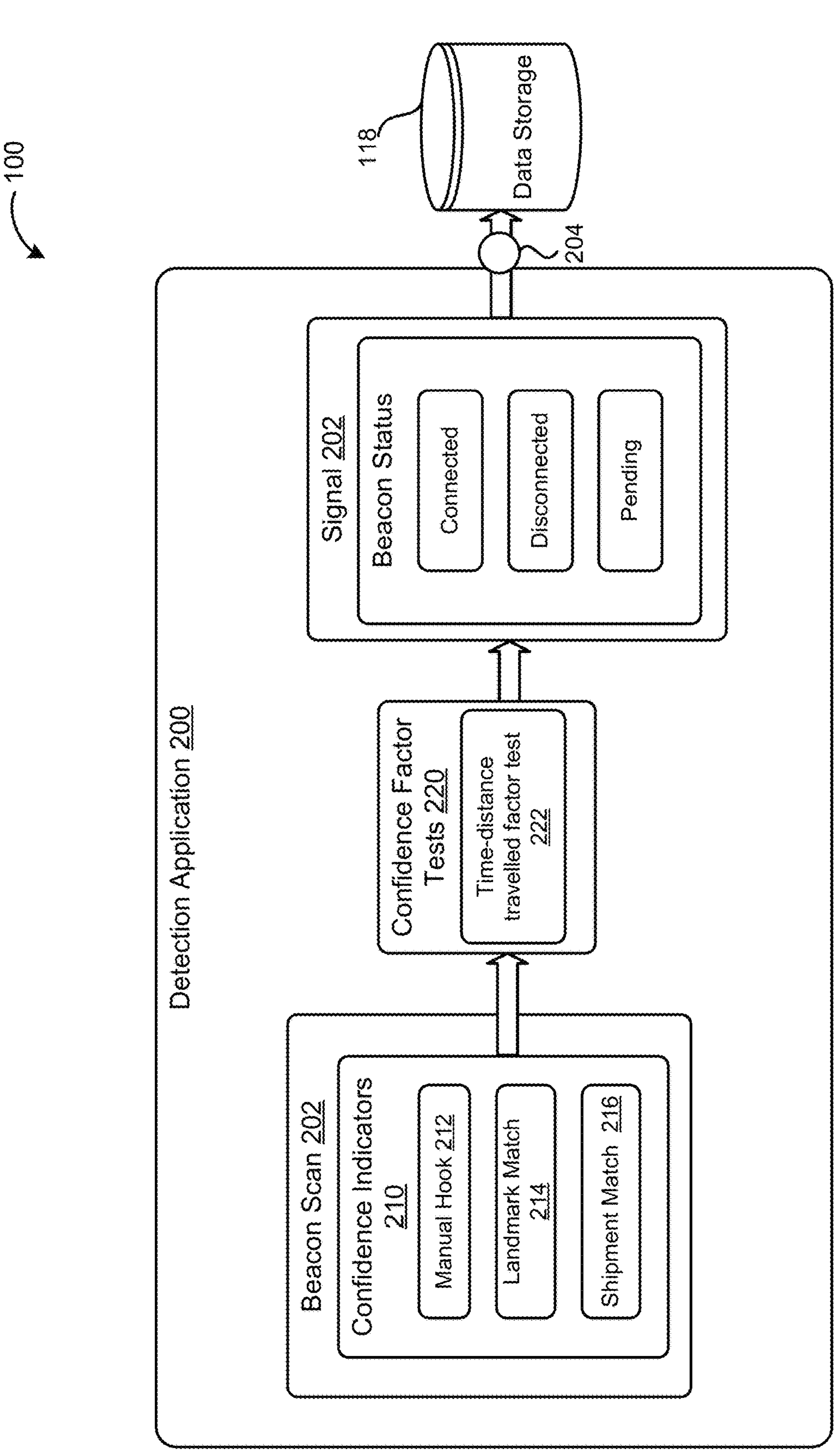
FIG. 5 is a schematic view of a detection application with confidence factor tests that determine a respective beacon status.
Figure 6:
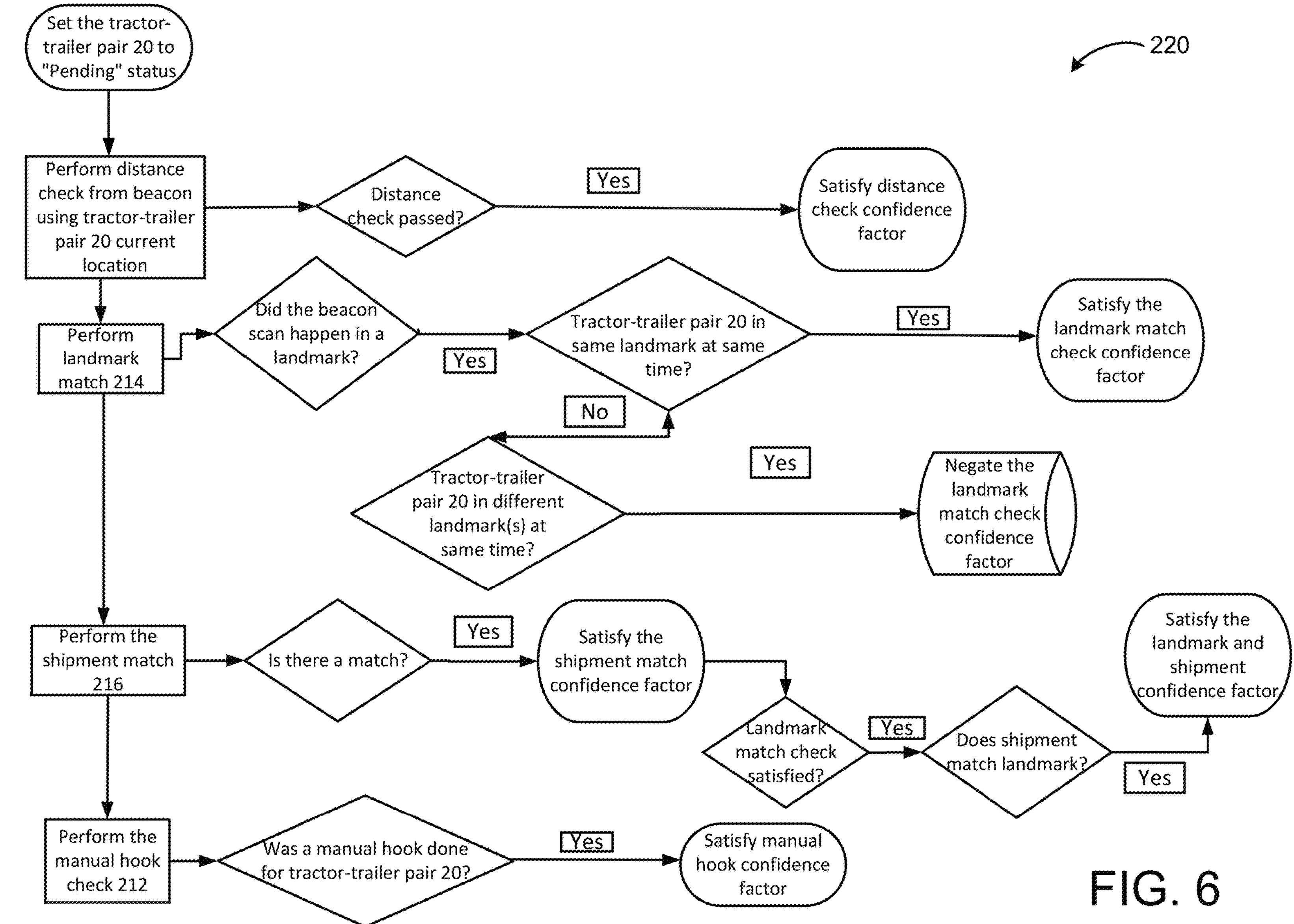
FIG. 6 is a flow diagram of decision steps of the confidence factor tests of FIG. 5.
Figure 7:
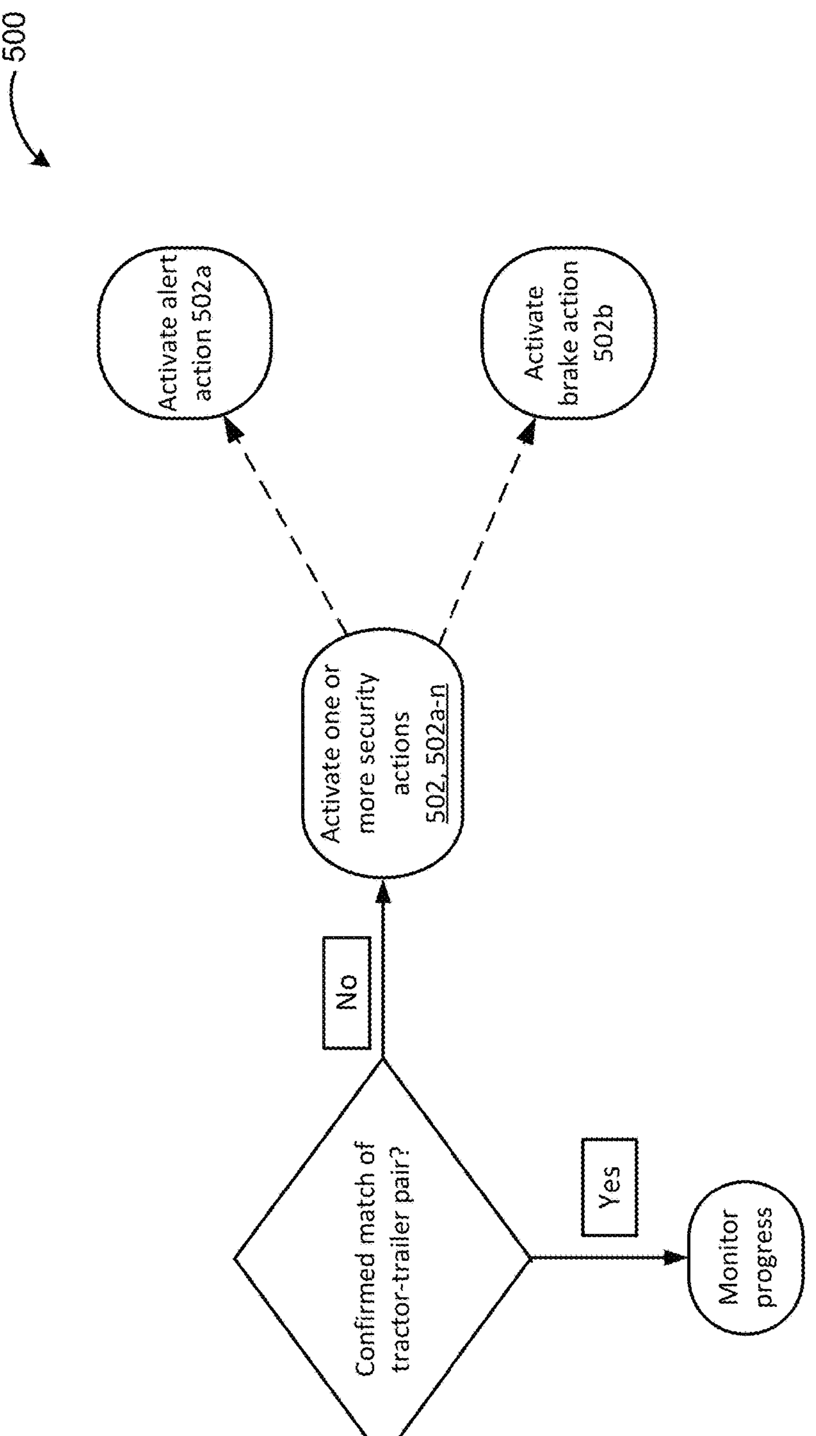
FIG. 7 is a flow diagram of decision steps of an anti-theft protocol of a detection application of the present disclosure.

Referring to FIGS. 1-3, the beacon 300 associated with the trailer 14 may be one of a plurality of beacons 300, 300*a-n* detected by the detection application 200, such that the detection application 200 is configured to detect a plurality of beacons 300, 300*a-n* proximate to the user device 12. The beacons 300, 300*a-n* are Bluetooth® enabled beacons that emit a signal that may be detected by the detection application 200 when the beacons 300, 300*a-n* are within a predetermined proximity 200*a* of the user device 12. Stated differently, the beacons 300, 300*a-n* are configured to be wirelessly connected with the user device 12 and is detected via wireless communication including, but not limited to, Bluetooth® detection. The beacons 300, 300*a-n* may thus be detected by the detection application 200 regardless of the direct coupling of the trailer 14 with the tractor 16.

It is generally contemplated that the predetermined proximity 200*a* may be approximately 0.1 miles. It is also contemplated that the predetermined proximity 200*a* may include, but is not limited to, approximately 0.2 miles, 0.3 miles, 0.4 miles, 0.5 miles, miles, 0.7 miles, 0.8 miles, 0.9 miles, or 1.0 mile. Stated differently, the predetermined proximity 200*a* may include a distance approximately greater than 0.1 miles or equal to 0.1 miles. The predetermined proximity 200*a* may also be approximately less than 0.1 miles.

The detection application 200 is configured to differentiate the detected beacons 300, 300*a-n* from other Bluetooth® enabled devices based on the ID of the beacons 300, 300*a-n*. While the ID identifies the beacons 300, 300*a-n* as trailer beacons, the detection application 200 is utilized to detect and confirm which beacon 300 corresponds to the trailer 14 connected with the respective tractor 16. The detection application 200 may be utilized in detecting and tracking the respective trailer 14 via the detection of the associated beacon 300, 300*a-n*, as described herein. The detection application 200 executes a beacon scan 202 at predetermined time intervals 200*b* to periodically detect beacons 300, 300*a-n* that may be near the user device 12. For example, the detection application 200 may be automatically launched by the system 100 approximately every 15 minutes and conduct a scan for approximately 15 to 20 seconds.

The predetermined time intervals 200*b* may also include a range of intervals between approximately 30 seconds and 30 minutes. For example, the predetermined time intervals 200*b* may include intervals of approximately 30 seconds, 40 seconds, 50 seconds, 1 minute, 5 minutes, 10 minutes, 15 minutes, 20 minutes, 25 minutes, or 30 minutes. It is also contemplated that the predetermined time intervals 200*b* may include any time interval within the range of approximately 30 second and 30 minutes, such that the predetermined time intervals 200*b* may be approximately greater than or equal to 30 seconds and less than or equal to 30 minutes. Alternatively, the predetermined time intervals 200*b* may be less than approximately 30 seconds and/or greater than approximately 30 minutes. The above described ranges may also be utilized for determining the duration of the scan, such that the scan may be conducted for any duration of time within the aforementioned ranges.

As described in more detail below, the detection application 200 records the detected beacons 300, 300*a-n* during the beacon scan and may record the relative proximity to the user device 12. The beacons 300, 300*a-n* may be coupled to or otherwise attached with the trailer 14 of a truck system 10, such that the detection application 200 coordinates the proximity of the trailer 14, the tractor 16, and the user device 12. Each of the trailer 14, the tractor 16, and the user device 12 are within a reasonable distance from each other at the time of the scan to execute the scan. The detection application 200 may determine based on a lack of proximity of a respective beacon 300, 300*a-n* that at least one of the beacons 300, 300*a-n* may be free from communication with the detection application 200. In response to determining that at least one of the beacons 300, 300*a-n* may be free from communication, the detection application 200 may record a disconnected status for the respective beacon. It is contemplated that the detection application 200 may flag the respective beacon 300, 300*a-n* detected as being disconnected and/or out of range in response to the beacon 300, 300*a-n* not being detected. In one example, if one of the trailer 14, the tractor 16, and/or the user device 12 is outside of the predetermined proximity 200*a*, then the detection application 200 may issue an alert and/or notification indicating that the scan could not be completed. Additionally or alternatively, the detection application 200 may alert that the scan was incomplete or otherwise indicate that one of the tractor 16, trailer 14, and/or user device 12 was disconnected from the system 100. The detection application 200 may also record and/or monitor the time and/or distance during which each of the elements of the truck system 10 remain connected without interruption. For example, the trailer 14 may be selectively hooked and unhooked from the tractor 16, and the detection application 200 may utilize the beacon scan to detect the duration of time in which the trailer 14 has remained hooked or otherwise connected with the tractor 16. All of the data gathered by the detection application 200 may be sent to the remote system 110 via a signal 204 for storage in the data storage 118.

Referring still to FIGS. 1-4, the system 100 is configured to periodically activate the detection application 200, such that the detection application 200 may be operating in the background of the user device 12 to detect potential beacons 300, 300*a-n*. For example, the detection application 200 may execute the beacon scan 202 at each predetermined time interval 200*b*, such that the detection application 200 may record information associated with each detected beacon 300, 300*a-n* along with a timestamp 206. It is also contemplated that the detection application 200 may execute the beacon scan 202 whenever the user device 12 detects a significant location change (e.g., moving more than approximately one mile). The detection application 200 may also periodically look up each of the recorded beacons 300, 300*a-n* to assess how many times the detection application 200 has evaluated each respective beacon 300, 300*a-n* within the predetermined time interval 200*b*. While the connection threshold 208 may be utilized to evaluate the connectivity of the respective detected beacon(s) 300, 300*a-n* relative to the user device 12, the connection threshold 208 is defined as a minimum threshold, such that the beacon 300 may not be detected during every beacon scan 202. Rather, the beacon 300 may be detected a minimum number of detections 208a as set by the connection threshold 208. By way of example, not limitation, the beacon 300 may be detected five times over a period of ten minutes, which satisfies a connection threshold 208 of five detection points. The system utilizes the predetermined time interval 200*b* to regulate the various connectivity of the detected beacons 300, 300*a-n* both in determining whether the beacon 300 is hooked or connected and in determining whether the beacon 300 is unhooked or disconnected, as described below.

It is contemplated that the system 100 executes a plurality of tests (e.g., the beacon scans) that ultimately result in the detection of proximal beacons. During the beacon scans, the beacons 300, 300*a-n* detected are reported as pending until a connection signal is detected. As discussed above, the confirmation signal corresponds to the detected beacon 300, 300*a-n* being within the predetermined proximity 200*a* of the user device 12 for the predetermined time interval 200*b*. It is contemplated that the predetermined time interval 200*b* may be defined as a time period in which the beacon scan is continuously run, such that the beacon scan 202 may be executed continuously during the predetermined time interval 200*b*. Alternatively, the predetermined time interval 200*b* may be defined as a time period in which the beacon scan is run only at predefined intervals. Stated differently, the beacon scan 202 may be executed intermittently at the predefined intervals over the predetermined time interval 200*b*. For example, the beacon scan may be executed at 15 second intervals, and the beacons 300, 300*a-n* detected may be recorded and repeatedly updated based on the information received during the periodic beacon scan. Either configuration may be advantageous for providing an accurate detection of an attached beacon to actively track and monitor the truck system 10.

With further reference to FIGS. 1-4 and in addition to the proximity of each detected beacon 300, 300*a-n*, the detection application 200 may also record a received signal attribute indication 302 (e.g., signal attribute), a measured signal attribute 304, an estimated signal attribute 306, a serial number 308 of the respective beacon 300, 300*a-n*, and the timestamp 206 of the beacon scan. Each of the signal attributes 302 of the beacons 300, 300*a-n* is recorded as a negative integer that represents the strength of the signal of the beacons 300, 300*a-n* as detected by the detection application 200. The signal attributes 302 may include, but are not limited to, signal strength, signal power, and/or signal frequency. For example, a signal attribute value closer to zero indicates that the signal attribute 302 is stronger compared to a signal attribute value further from zero. The signal attribute 302 may be used to calculate the estimated distance of the beacon(s) 300, 300*a-n* detected in the beacon scan from the tractor 16 and/or the user device 12. The measured signal attribute 304 is a hard-coded value for the respective beacon 300, 300*a-n*, such that a negative integer represents the expected signal attribute at a distance of approximately one meter to the respective beacon 300, 300*a-n*. The estimated signal attribute 306 is calculated by the detection application 200 as the signal attribute 302 may vary as a result of potential environmental noise relative to the beacons 300, 300*a-n* and the user device 12. The estimated signal attribute 306 is calculated by iterating through all of the signal attribute 302 values recorded for a respective beacon 300, 300*a-n*. An example formula for calculating the estimated signal attribute 306 is:

$$\text{Estimated signal attribute} = (\text{previously calculated estimated signal attribute} * \text{prior value weight}) + \text{recorded signal attribute} * (1 - \text{prior value weight})$$

During the scan, it is contemplated that various confidence indicators 210 may be utilized by the detection application 200 in evaluating whether the beacon(s) 300, 300*a-n* has a confirmed connection with the user device 12. For example, the detection application 200 may detect a manual hook 212 where the trailer 14 that may have been previously unhooked from the tractor 16 is reattached, such that there is a repeat pairing of the tractor 16 and the trailer 14. Additionally or alternatively, the detection application 200 may utilize a landmark match 214 (e.g., a geofence) to identify whether the user device 12, the trailer 14, and the tractor 16 are detected proximate to a predetermined landmark within the predetermined time interval 200*b* of the reported beacon scan 202. It is contemplated that the predetermined landmark may be set by the system 100. The detection application 200 may also utilized a shipment match 216 to determine the connection with the truck device 10. For example, a detected beacon 300*a* of the respective trailer 14 may correspond with the trailer 14 indicated as part of an active shipment with the truck system 10 within a prescheduled time of a scheduled transport of the shipment. Additionally or alternatively, the detection application 200 may utilize the landmark match 214 in combination with the shipment match 216, such that an additional check is performed to determine if the origin and/or destination of the shipment match 216 or otherwise correspond with the landmark match 214 when both of the confidence indicators for the shipment match 216 and the landmark match 214 have respectively both been satisfied, as described below.

Referring to FIGS. 3-7, each of the above confidence indicators 210 may be utilized by the detection application 200 to conduct confidence factor tests 220. It is contemplated that the detection application 200 may selectively utilize the above confidence indicators 210 singly or in any combination. The confidence factor tests 220 may include, but are not limited to, a time-distance travelled factor test 222. As mentioned above, the confidence factor test 220 may initially perform the time-distance travelled factor test 222 to determine whether the beacon 300 is within the predetermined proximity 200*a* of the user device 12 by utilizing the current location of the tractor-trailer pair 20. The time-distance travelled factor 222 is utilized to determine whether the detected beacon 300*a* has travelled a predetermined distance for a duration of time relative to the user device 12. The predetermined distance is defined as a distance over the duration of time in which the beacon 300 is detected within the predetermined proximity 200*a* of the user device 12.

For example and as similarly described with respect to the predetermined proximity 200*a*, the predetermined distance may be approximately 0.1 miles. It is also contemplated that the predetermined distance my include, but is not limited to, approximately 0.2 miles, 0.3 miles, 0.4 miles, 0.5 miles, 0.6 miles, 0.7 miles, 0.8 miles, 0.9 miles, or 1.0 mile. Stated differently, the predetermined distance may include a distance approximately greater than 0.1 miles or equal to 0.1 miles. The predetermined distance may also be approximately less than 0.1 miles.

If the time-distance travelled factor 222 is not satisfied, then the detection application 200 may compare the time and location of the beacon scan 202 with the most recent time and location feedback from the user device 12 to determine whether the detected beacon 300 and the user device 12 have traveled a reasonable distance and time concurrently from the earlier beacon scan 202. If yes, then the time-distance factor test 222 is satisfied, and the detection application 200 may report a connected status. If the result is inconclusive, then the status of the detected beacon 300 may remain pending or be otherwise reported as unsatisfied with respect to the time-distance factor test 222. If, instead, the result shows conclusively that the detected beacon 300 and the user device 12 are moving increasingly distant to one another, then the detection application 200 removes the detected beacon 300 from the reported list of detected beacons 300, 300*a-n*. The time-distance travelled factor test 222 obtains the current location for the tractor-trailer pair 20 and calculates the distance from each to the location of the beacon scan 202. The tractor 16 and the trailer 14 must be within an acceptable distance from the beacon scan 202 location to pass the time-distance travelled factor test 222.

The confidence factor tests 220 may also evaluate testing the confidence of each of the manual hook 212, the landmark match 214, and/or the shipment match 216. With respect to the manual hook 212, if no manual hook 212 is detected, the detection application 200 may test to detect whether a manual hook transaction was executed for the same user device 12 and for the same tractor-trailer pair 20. If the detection application 200 receives confirmation, then the manual hook confidence factor test 220 is satisfied. The confidence factor test 220 may also perform the landmark match 214 to determine whether the beacon scan 202 occurred within the landmark predefined by the system 100. If the beacon scan 202 is executed within the landmark, the detection application 200 determines that the landmark match 214 is confirmed and the confidence check for the landmark match 214 is satisfied. If no, then the detection application 200 determines whether the tractor-trailer pair 20 is at a different landmark at the same time that the landmark match 214 was performed, and if yes, then the landmark match 214 is negated and the confidence check is not satisfied. The detection application 200 may test to determine whether the tractor 16 and trailer 14 were in the landmark match 214 within a reasonable time from the original beacon scan 202. If yes, then the detection application 200 reports a confirmation status of the beacon 300, 300*a-n*. Stated differently, the overlap of the beacon 300, 300*a-n* location with the landmark may result in a match signal, which may confirm that the respective beacon 300 is communicatively connected with the detection application 200.

With respect to the shipment match 216, the detection application 200 tests to determine if there is an active shipment matching the tractor-trailer pair 20 with a scheduled pick-up or delivery within a reasonable amount of time from the original beacon scan 202. The detection application 200 may perform the shipment match 216 confidence check separate or in combination with the landmark match 214. For example, the detection application may combine the shipment match 216 confidence check with the landmark match 214 confidence check by determining whether the shipment matches the landmark. The shipment matches the landmark when all three components (e.g., trailer 14, tractor 16, and user device 12) were found at the landmark that matches a customer on the shipment. In one example, the combined landmark and shipment confirmation check is only satisfied when the landmark is an origin landmark that matches a shipper and/or destination landmark matching a consignee. If yes, then the combined landmark match 214 and the shipment match 216 confirmation checks are satisfied.

If the above have been satisfied, then the tractor-trailer pair 20 are identified as having a confirmed hook with the beacon 300, 300*a-n*, and the detection application 200 may report a confirmed status. If not, then the beacon 300, 300*a-n* may remain pending until the detection application 200 can confirm the status of the beacon 300, 300*a-n*. Additionally or alternatively, the detection application 200 may determine that one of the detected beacons 300*n* is not connected with the tractor-trailer pair 20 and may thus remove the detected beacon 300*n* from the report.

It is also contemplated that the beacon scan 202 may result in identifying an improper pairing between the tractor 16 and the trailer 14. For example, each of the tractor-trailer pairs 20 may be programmed in the system 100, such that the beacon 300, 300*a-n* coupled to the trailer 14 may be used to identify the tractor-trailer pair 20 during the beacon scan 202. If the system 100 detects a mismatched tractor-trailer pair 20 over a predetermined period of time and/or distance during the beacon scan 202, then the system 100 may trigger an anti-theft protocol 500. The anti-theft protocol 500 is configured to prevent intentional or unintentional mispairings between tractors 16 and trailers 14 by associating a specific beacon 300, 300*a-n* with a specific tractor-trailer pair 20.

The anti-theft protocol 500 may result in various security actions 502, 502*a-n* being executed by the system 100. For example, an alert action 502*a* may be prompted and may be displayed on the user device 12 and/or within the tractor 16. The alert action 502*a* may include, but is not limited to, a safety warning or alarm, which would likely result in the driver of the tractor-trailer pair 20 pulling to a side of a road to investigate the source of the alarm. For example, the safety warning may be associated with known protocols that a driver would understand may result in damage to the tractor 16 if not immediately addressed. Additionally or alternatively, the security actions 502 may include a brake action 502*b*, which may automatically apply the brakes in a gradual manner to eventually halt movement of the tractor 16. Once the tractor 16 has halted to a stop, the brake action 502*b* may lock the brakes of the tractor 16 to prevent additional movement. The brake action 502*b* may be used in combination with the alert action 502*a*, such that the brakes of the tractor 16 may be locked once the tractor-trailer pair 20 is stopped. It is contemplated that the security actions 502, 502*a-n* may be used in any combination and may include other mechanisms configured to prevent unauthorized transport of the trailer 14 based on the detected beacon 300, 300*a-n*. The anti-theft protocol 500 may also result in a notification 504 being sent via the system 100 to an administrator of the system 100 with a notification that the anti-theft protocol 500 and subsequent security actions 502, 502*a-n* have been triggered.

Referring still to FIGS. 3-7, once the beacon scan 202 is complete, the detection application 200 may update a status of the detected beacons 300, 300*a-n*. For example, if a beacon 300 is determined to be connected, the detection application 200 may update the status to confirmed. Where further confirmation factor tests 220 may be advantageous to determine the status of a detected beacon, the detection application 200 may record a pending status. If a beacon 300*n* was previously detected but were not detected in the most recent beacon scan 202, the detection application 200 may report an out of range status.

As mentioned above, the detection application 200 may utilize the detected signal attribute and serial number of the detected beacons 300, 300*a-n* to estimate the relative distance of each detected beacon 300, 300*a-n*. The detection application 200 may classify the detected beacons 300, 300*a-n* based on the determined distance and/or proximity relative to the user device 12. The detection application 200 utilizes multiple beacon scans 202 to determine whether a connection is verified based on the proximity of the detected beacon 300*a* over the predetermined time interval 200*b*. Before the detection application 200 determines whether a connection is verified, the detection application 200 may relay to the system 100 that the status of the detected beacon(s) 300 is pending. The detection application 200 may perform confirmation tests to verify the connection with the detected beacon 300*a*. For example, the detection application 200 may first determine whether the detected beacon(s) 300, 300*a-n* has satisfied the predetermined time interval 200*b* by being proximal to the user device 12 for the predetermined time interval 200*b*. If the detection application 200 determines that the beacon(s) 300, 300*a-n* has not satisfied the proximity test, then the detection application 200 may compare the time and location of an earlier beacon scan 202 and determine whether the detected beacon(s) 300, 300*a-n* is in a reasonable distance from the user device 12 within a reasonable amount of time from the earlier beacon scan 202. If yes, then the predetermined time interval 200*b* is satisfied and the detection application 200 may report that the detected beacon 300, 300*a-n* is connected. If, for example, the detected beacon 300*b* is not within a reasonable distance and/or within a reasonable amount of time from the earlier beacon scan 202, then the detection application 200 removes the pending status of the detected beacon 300*b*. Once the pending status is removed, the beacon 300*b* is no longer under consideration by the detection application 200 for being a connected beacon 300.

The detection application 200 determines whether a respective beacon 300*a* is connected based on the proximity of the beacon 300. For example, during the distance check 222, the detection application 200 may determine that the beacon 300*a* is connected when the beacon 300*a* is detected as the closest beacon 300, 300*a-n* to the user device 12. Where a beacon 300*n* that was previously detected is no longer detected, the detection application 200 may update the status for the respective beacon 300*n* as being disconnected or out of range. For example, the beacon 300 previously detected and connected with the detection application 200 has not been detected over the last five minutes of the beacon scan 202, and the detection application 200 may restart the beacon scan 202 to determine whether a new trailer 14 has been connected by determining the connectivity of a detected beacon 300, as outlined herein. Alternatively, the detection application 200 may not report any out of range beacons 300*n* and instead continuously update the status of proximal beacons 300 and dropping those that move out of range during the predetermined time interval 200*b* of the beacon scan 202. Once the status of the respective beacons 300, 300*a-n* is updated and displayed on the user device 12, the detection application 200 sends a list of all the detected beacons 300, 300*a-n* to the data storage 118 along with the respective status of each beacon 300, 300*a-n*. The list of beacons 300, 300*a-n* may be recorded by the data storage 118 for future reference and/or comparison purposes.

The confidence factor tests 220 may also include determining whether a time-distance travelled factor is satisfied. The time-distance travelled factor is utilized to determine whether the detected beacon 300*a* has travelled the predetermined distance for the predetermined duration of time relative to the user device 12. If the time-distance travelled factor is not satisfied, then the detection application 200 may compare the time and location of the beacon scan 202 with the most recent time and location feedback from the user device 12 to determine whether the detected beacon 300*a* and the user device 12 have traveled a reasonable distance and time concurrently from the earlier beacon scan 202. If yes, then the time-distance factor is satisfied, and the detection application 200 may report a connected status. If the result is inconclusive, then the status of the detected beacon 300*a* may remain pending or be otherwise reported as unsatisfied with respect to the time-distance factor. If, instead, the result shows conclusively that the detected beacon 300*a* and the user device 12 are moving increasingly distant to one another, then the detection application 200 removes the detected beacon 300*a* from the reported list of detected beacons 300, 300*a-n*.

Figure 8:
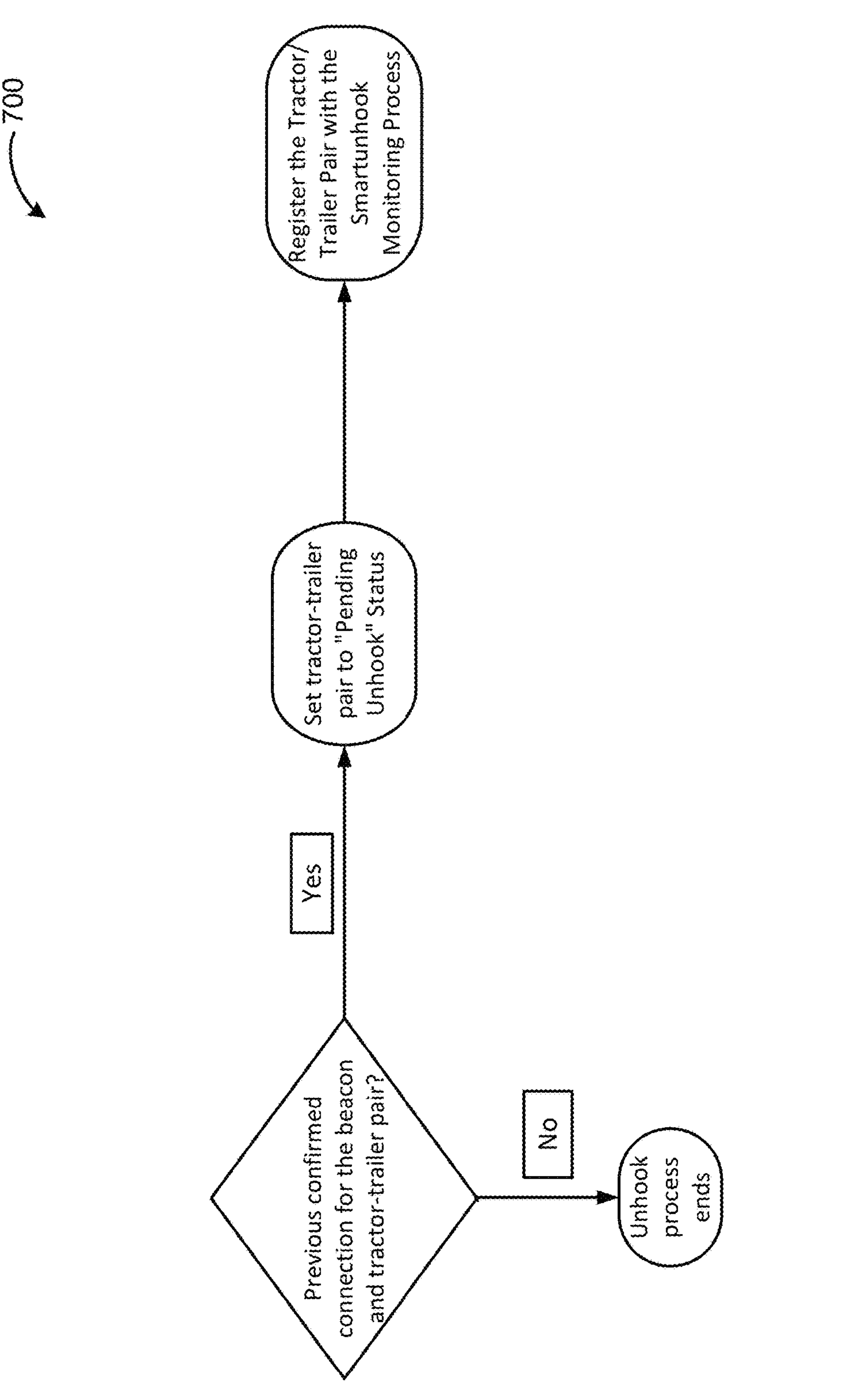
FIG. 8 is a flow diagram of decision steps of an unhook process of a detection application of the present disclosure.
Figure 9:
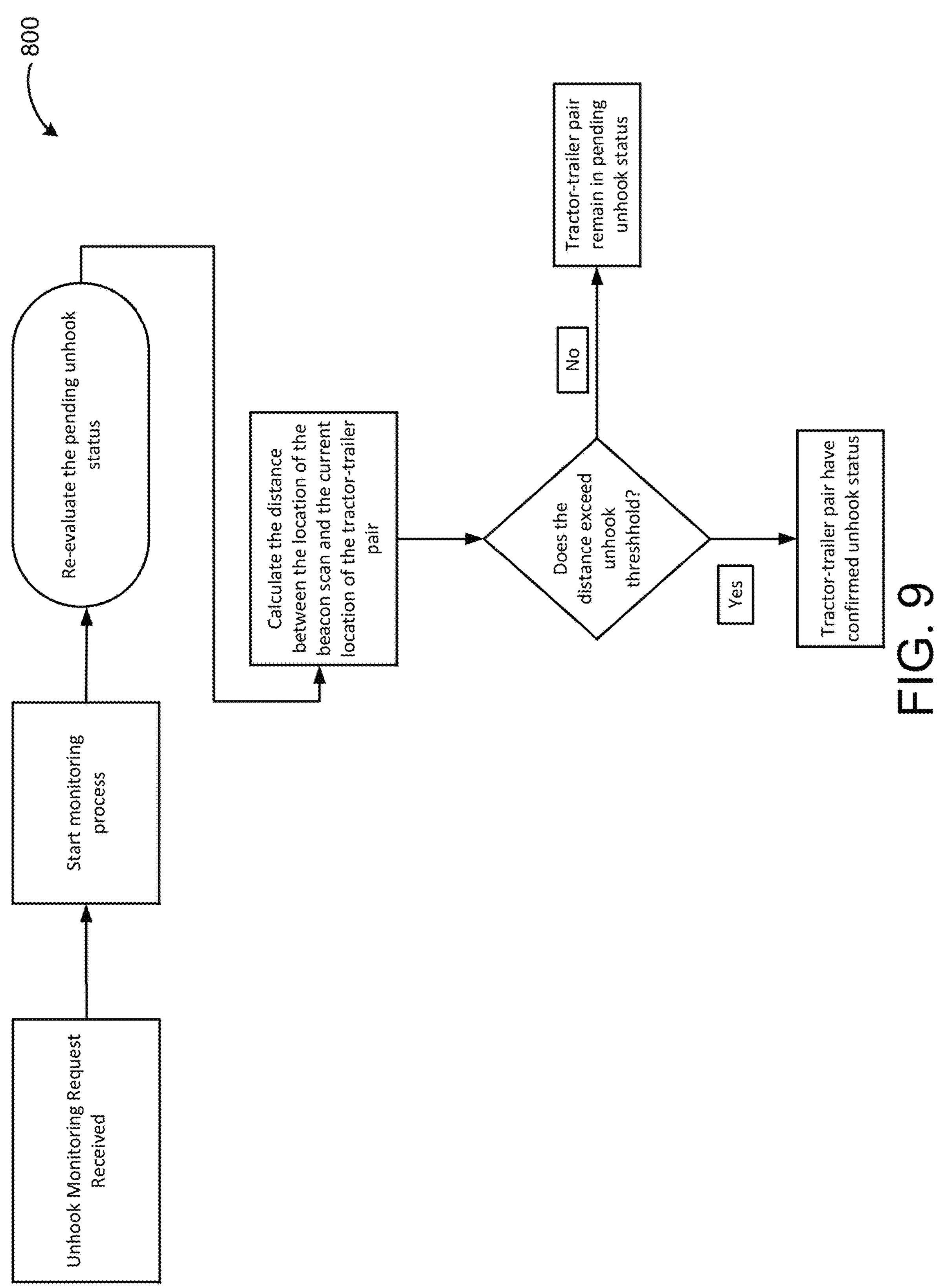
FIG. 9 is a flow diagram of decision steps of an unhook monitoring process of the detection application of FIG. 7.

Referring to FIGS. 8 and 9, the system 100 may communicate with the detection application 200 that an unhook process 700 is initiated. The unhook process 700 first determines whether the beacon 300 and the tractor-trailer pair 20 have a confirmed connection. If not, then the unhook process 700 is terminated. If confirmed, the system 100 notes that the trailer 16 that is confirmed as hooked with the trailer 14 will be unhooked at a particular destination. For the unhook process, the detection application 200 executes a two-step process in determining the connectivity of a respective detected beacon 300. First, the detection application receives an initial beacon scan 202 for the tractor-trailer pair 20 and initiates the beacon 300 associated with the tractor 16 and trailer 14 pair as having a pending status. If there is a confirmed connection, then the unhook process 700 may proceed, and the detection application 200 may record the tractor-trailer pair 20 as having a pending unhook status. The system 100 may, in turn, register the tractor-trailer pair 20 with an unhook monitoring process 800 until the trailer 14 is unhooked. Second, the detection application 200 monitors the tractor 16 and trailer 14 pair by running the beacon scans 202 at regular intervals to evaluate the current location of the tractor-trailer pair 20. It is generally contemplated that the monitoring process 800 may run for a period of time (i.e., 30 minutes) for the given tractor-trailer pair 20. It is further contemplated that the monitoring process 800 may be initialized approximately every 30 minutes to re-evaluate the pending unhook status. The detection application 200 may calculate the distance between the location of the beacon scan 202 and the current location of the tractor-trailer pair 20 to determine whether the distance exceeds the unhook threshold and continues to monitor until the exceeded distance is detected. Once the beacon 300 is detected at a reasonable distance (i.e., exceeds the unhook threshold) from the trailer 14, the detection application 200 reports to the system 100 a confirmed unhook status.

Figure 10:
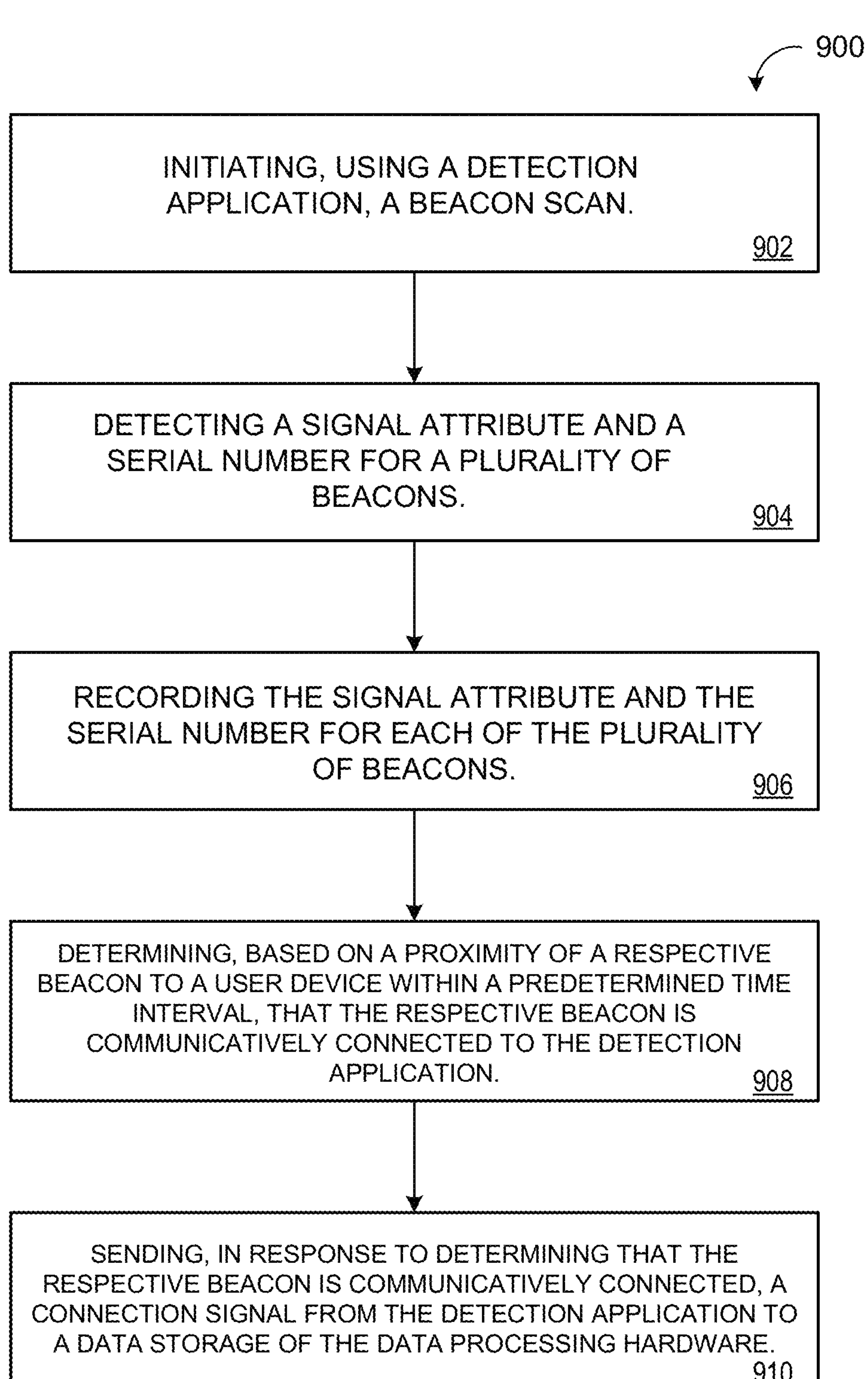
FIG. 10 is a flowchart of an example arrangement of operations for a method of detecting and tracking a trailer of the present disclosure.

FIG. 10 is a flowchart of an exemplary arrangement of operations for a method 900 of the system 100. The method 900, at operation 902, includes initiating, using a detection application 200, a beacon scan 202, and, at operation 904, detecting a signal attribute 302 and a serial number 308 for a plurality of beacons 300, 300*a-n*. The method 900, at operation 906, includes recording the signal attribute 302 and the serial number 308 for each of the plurality of beacons 300, 300*a-n*. At operation 908, the method 900 includes determining, based on a proximity of a respective beacon 300, 300*a-n* to a user device 12 within a predetermined time interval 200*b*, that the respective beacon 300, 300*a-n* is communicatively connected to the detection application. The method 900, at operation 910, further includes sending, in response to determining that the respective beacon 300, 300*a-n* is communicatively connected, a connection signal from the detection application 200 to data storage 118 of the data processing hardware 110.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:

initiating, using a detection application, a beacon scan;

detecting a signal attribute and a serial number for a plurality of beacons;

recording the signal attribute and the serial number for each of the plurality of beacons;

validating that a respective beacon is communicatively connected to the detection application by identifying a proximity of the respective beacon to a user device for a duration of a predetermined time interval; and sending, in response to validating that the respective beacon is communicatively connected, a connection signal from the detection application to one of data storage of the detection application and the respective beacon.

2. The method of claim 1, further comprising:

determining, based on a lack of proximity of a respective beacon, that the plurality of beacons are free from communication with the detection application; and sending, in response to determining that the plurality of beacons are free from communication, a disconnect signal for the respective beacon.

3. The method of claim 1, wherein sending the connection signal further comprises sending a list of all of the plurality of beacons detected to a data storage.

4. The method of claim 3, wherein sending a list of all of the plurality of beacons detected includes identifying a location of the detected beacons, the location including at least one of an exterior placement, an interior placement, a front placement, a rear placement, and a side placement.

5. The method of claim 1, further comprising flagging, in response to a respective beacon of the plurality of beacons not being detected, the respective beacon as out of range.

6. The method of claim 1, wherein validating that the respective beacon is communicatively connected further includes executing the beacon scan continuously during the predetermined time interval.

7. The method of claim 1, wherein validating that the respective beacon is communicatively connected further includes executing the beacon scan intermittently at predefined intervals over the predetermined time interval.

8. The method of claim 1, further comprising:

identifying a landmark;

comparing a location of the plurality of beacons with the landmark; and generating, in response to the location of the plurality of beacons overlapping with the landmark, a match signal.

9. The method of claim 8, wherein validating that the respective beacon is communicatively connected to the detection application further comprises confirming, using the match signal, that the respective beacon is communicatively connected.

10. The method of claim 1, wherein validating that the respective beacon is communicatively connected to the detection application further comprises comparing a number of evaluations of the respective beacon to a connection threshold of the predetermined time interval.

11. The method of claim 10, wherein the connection threshold comprises a minimum number of detections for the respective beacon.

12. A system comprising:

data processing hardware; and memory hardware in communication with the data processing hardware, the memory hardware storing instructions that when executed on the data processing hardware cause the data processing hardware to perform operations comprising:

initiating, using a detection application, a beacon scan;

detecting a signal attribute and a serial number for a plurality of beacons;

recording the signal attribute and the serial number for each of the plurality of beacons;

validating that a respective beacon is communicatively connected to the detection application by identifying a proximity of the respective beacon to a user for a duration of a predetermined time interval; and sending, in response to validating that the respective beacon is communicatively connected, a connection signal from the detection application to one of data storage of the detection application and the respective beacon.

13. The system of claim 12, further comprising:

determining, based on a lack of proximity of a respective beacon, that the plurality of beacons are free from communication with the detection application; and sending, in response to determining that the plurality of beacons are free from communication, a disconnect signal for the respective beacon.

14. The system of claim 12, wherein sending the connection signal further comprises sending a list of all of the plurality of beacons detected to a data storage of the system.

15. The system of claim 12, further comprising flagging, in response to a respective beacon of the plurality of beacons not being detected, the respective beacon as out of range.

16. The system of claim 12, wherein validating that the respective beacon is communicatively connected further includes executing the beacon scan continuously during the predetermined time interval.

17. The system of claim 12, wherein validating that the respective beacon is communicatively connected further includes executing the beacon scan intermittently at predefined intervals over the predetermined time interval.

18. The system of claim 12, further comprising:

identifying a landmark;

comparing a location of the plurality of beacons with the landmark; and generating, in response to the location of the plurality of beacons overlapping with the landmark, a match signal.

19. The system of claim 18, wherein validating that the respective beacon is communicatively connected to the detection application further comprises confirming, using the match signal, that the respective beacon is communicatively connected.

20. The system of claim 12, wherein validating that the respective beacon is communicatively connected to the detection application further comprises comparing a number of evaluations of the respective beacon to a connection threshold of the predetermined time interval.

21. The system of claim 20, wherein the connection threshold comprises a minimum number of detections for the respective beacon.

22. The system of claim 12, further comprising:

identifying an improper beacon pairing; and activating, in response to the improper beacon pairing, an anti-theft protocol, the anti-theft protocol including security actions; and sending, in response to the anti-theft protocol, a notification of the security actions.

23. The method of claim 1, further comprising:

identifying an improper beacon pairing; and activating, in response to the improper beacon pairing, an anti-theft protocol, the anti-theft protocol including security actions; and sending, in response to the anti-theft protocol, a notification of the security actions.

* * * * *